United States Patent [19]
Lichtenberg

[11] 3,847,087
[45] Nov. 12, 1974

[54] POWER TRANSMISSION ARRANGEMENT FOR A MAGNETIC SUSPENSION RAILROAD

[75] Inventor: Alfred Lichtenberg, Erlangen, Germany

[73] Assignee: Siemens Aktiengesellschaft, Munchen, Germany

[22] Filed: July 26, 1973

[21] Appl. No.: 382,882

[30] Foreign Application Priority Data
Aug. 11, 1972 Germany.......................... 2239595

[52] U.S. Cl............ 104/148 MS, 308/10, 104/130, 191/45 R
[51] Int. Cl......................... B61b 13/08, B60l 5/00
[58] Field of Search........ 104/148 MS, 148 SS, 130, 104/148 R; 308/10; 191/45 R, 50, 55, 59.1

[56] References Cited
UNITED STATES PATENTS
| | | | |
|---|---|---|---|
| 1,020,943 | 3/1912 | Bachelet | 310/13 |
| 3,712,239 | 1/1973 | Colovas et al. | 104/130 |
| 3,768,417 | 10/1973 | Thornton et al. | 104/148 SS |

Primary Examiner—Robert S. Ward, Jr.
Attorney, Agent, or Firm—Kenyon & Kenyon Reilly Carr & Chapin

[57] ABSTRACT

An improved power transmission arrangement for use in a railroad where the vehicles are suspended and guided by magnetic forces developed between conductor loops in the vehicle and plates supported on the roadbed in which the plates used in developing the magnetic forces are also used as the power transmission conductors. Also shown is a current collector contacting the conductor plates which current conductor moves back and forth transversely to equalize wear.

3 Claims, 1 Drawing Figure

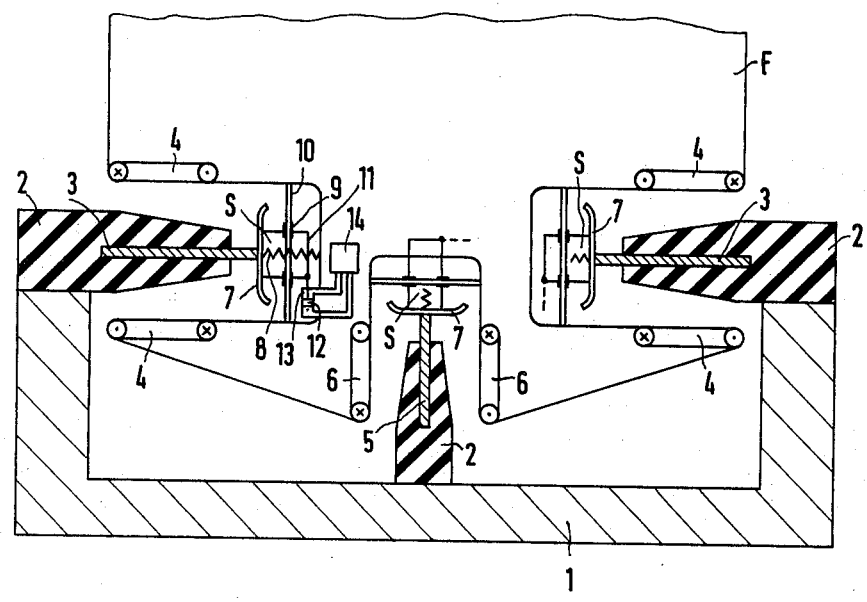

3,847,087

POWER TRANSMISSION ARRANGEMENT FOR A MAGNETIC SUSPENSION RAILROAD

BACKGROUND OF THE INVENTION

This invention relates to magnetic suspension railroads in general and more particularly to an improved power transmission arrangement for use in such railroads.

In magnetic suspension railroad systems, the railroad vehicles are maintained in a suspended condition and guided over the roadbed by magnetic forces. Generally these magnetic forces are developed using a current carrying primary conductor loops mounted in the vehicle which co-act with secondary loops, for example conducting plates on the roadbed, to develop the necessary lifting and/or guidance forces. Naturally the railroad vehicle must obtain electrical power both to generate the necessary magnetic forces for lifting and guidance and also for purposes of propulsion. This requires contact by the moving vehicle with a live conductor located somewhere in a fixed location with respect to the roadbed.

In conventional electric railroads, the propulsion vehicles are equipped with pantograph collectors which in operation slide over a trolley wire arranged in zig-zag fashion. In subways the collectors are arranged laterally at the vehicle. On the ties of the track or, in cases where a roadbed without ties is provided, on a separate tie, a third rail bracket is supplied which carries a live rail arranged parallel to the track. In such systems the trolley shoe of the collector has about the same width as the third rail. The application of these known arrangements for use in the transmission of power to the vehicles of a suspension railroad results in a considerable expenditure of money, particularly in regard to the materials required. Thus there is a need for a power transmission system for use in suspension railroads which effectively supplies power to the vehicles thereon without being prohibitively expensive. Such a power transmission arrangement should use the minimum possible number of components to meet this end.

SUMMARY OF THE INVENTION

The present invention solves this problem by using the supports for the secondary conductor loops or the conducting plates used as secondary conductor loops as live current carriers in place of the third rail. The plates or supports are insulated and because of their large area, in addition to serving a dual purpose, minimized resistance losses. For contacting the plate or plates, one or more collectors is provided on the movable vehicle which collectors comprise sliding strips. The sliding strips are adapted for back and forth motion with respect to the live rails or plates that they are contacting in order to insure uniform wear of the sliding surfaces of the collector despite the fact that the rails which they contact are quite narrow with respect to the sliding strip collectors. Through the arrangement of the present invention considerable savings are obtained since separate third rail live conductors are not required.

BRIEF DESCRIPTION OF THE DRAWING

The single FIGURE is a cross sectional view through a section of roadbed showing a vehicle magnetically supported with the power transmission arrangement of the present invention installed.

DETAILED DESCRIPTION OF THE PREFERRED EMBODIMENT

As shown on the FIGURE three insulating supports 2 are secured to the roadbed 1 of the suspension railroad. Each of the supports 2 supports a conductive plate. The right and left support members 2 support the parallel tracks of conductor plates 3 while the vertical support 2 in the center supports a conductor plate 5. Each of the support members 2 is made of an insulation material so as to insulate their associated conductor plates 3 and 5 from the roadbed. On each side in the vehicle F are installed primary conducting loops 4 which interact with the conductor plates 3 to generate magnetic forces to maintain the vehicle F in a suspended condition. Also installed are current carrying loops 6 which react with the conductor plate 5 to maintain lateral guidance of the vehicle F. In conventional fashion magnetic return members used in linear motor propulsion and which are not shown will be provided.

The insulation of the conductor plates 3 and 5 allows them to be used in the present invention as live rails for providing current to the vehicle, which current may then be used for support, guidance and propulsion. Each of the support plates 3 and 5 is contacted by a long sliding strip 7 on the vehicle F forming the shoe of the collector S. Each of the sliding strips 7 has associated therewith a spring 8 which holds it against its respective conductor plate. Each sliding strip 7 is also mounted in sliding bearings 9 which permit lateral motion on a guide rod 10. The collector S is mechanically connected to a connecting rod 11 which is driven by a piston 12 on whose cylinder a pressure medium alternately acts at one end or the other. A control device 14 is provided which will control the flow of the medium to the cylinder to cause the collector S to move back and forth on the guide rod 10. This thereby assures even wearing of the sliding strip 7 even though it is large in comparison to the end of the conducting plate which is contacts. The current obtained from the collector S through the sliding strip 7 is then electrically conducted in conventional fashion to the various loads in the vehicle F.

Thus an improved arrangement for providing power transmission to a vehicle in a suspension railroad which results in considerable material savings has been shown. Although a specific embodiment has been illustrated and described, it will be obvious to those skilled in the art that various modifications may be made without departing from the spirit of the invention which is intended to be limited solely by the appended claims.

What is claimed is:

1. An improved power transmission arrangement for a suspension railroad of the type in which magnets or current carrying primary conductor loops installed in a vehicle react with secondary conductor loops or electrically conducting plates installed on the roadbed for the purpose of generating forces for lifting and guidance comprising:
   a. means supporting the secondary conductor loops or electrically conducting plates so that they are insulated from the roadbed;

b. at least one live rail supported by one of said insulating supports; and
c. at least one collector having a long sliding strip mounted on the vehicle and arranged to contact said live rail.

2. The invention according to claim 1 wherein secondary conduction plates are supported by the insulating members and wherein said secondary conduction plates are also used as live rails.

3. The invention according to claim 2 wherein said conducting plates are arranged parallel to the axis of motion, wherein said collector is supported for motion transverse to the axis of said conduction plates, and further including means to move said collector back and forth.

* * * * *